March 30, 1943.  A. ARONEY  2,315,178
CREAM SEPARATOR
Filed May 3, 1941
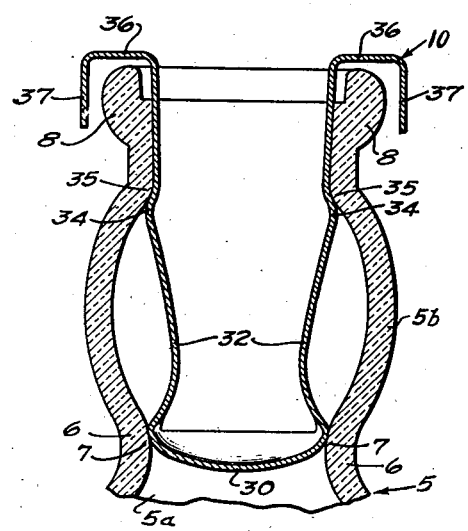
Inventor
Anthony Aroney.
Attorney Patented Mar. 30, 1943

2,315,178

UNITED STATES PATENT OFFICE 2,315,178

CREAM SEPARATOR

Anthony Aroney, Los Angeles, Calif.

Application May 3, 1941, Serial No. 391,745

2 Claims. (Cl. 210—51.5)

My invention has to do with cream separators.

While separators or valve members for separating cream from the milk in milk bottles are known, those prior devices have been objectionable in that they do not embody any means for automatically maintaining the separator in a seated or bottle neck closing position without the application of manual pressure applied at the pouring end of the bottle. This has rendered such prior devices unsanitary in that when pouring liquid from the bottle the user necessarily has to place his fingers in the path of the liquid. Another objection to prior devices is that they do not have any means for positively insuring even and effective seating of the valve element used to separate the cream containing area from the milk containing area of the bottle.

It is therefore an object of my invention to provide a device which is sanitary, highly efficient, which automatically seats itself and remains resiliently seated when desired; which provides minimum of obstruction for the outlet end of the milk bottle; which may be left in the bottle as a closure therefor; and which is extremely economical of manufacture.

Other objects and advantages will become apparent from the following detailed description of one presently preferred adaptation of my invention, for which purpose I shall refer to the accompanying drawing, in which:

The single figure is a vertical section showing my device applied to a milk bottle.

In the drawing, I show at 5 a milk bottle having a body portion 5a and a neck portion 5b communicating with the body through a reduced diameter portion 6, the latter portion providing an upwardly facing valve seat 7. When the bottle is filled with milk and cream, the cream line is approximately even with the plane of the valve seat 7, the cream rising thereabove and being contained within the neck. From the restricted portion 6, the neck curves outwardly, upwardly and inwardly, providing a downwardly facing annular shoulder 35 adjacent the outer end of the neck. A peripheral flange 8 is provided on the neck.

My improved valve or separator member for use in conjunction with a bottle so constructed, is formed of a resilient material, such as spring metal, and is generally designated by the numeral 10, being somewhat U-shaped in longitudinal section and presenting a concavo-convex disk-like bottom portion 30 which seats around its bottom peripheral portion against seat 7 to separate the cream thereabove from the milk therebelow.

Member 30 is of a diameter enabling it to be inserted through the open end of the neck and has an annular shape conforming to the seat 7. Oppositely disposed stems, here shown as two in number, 32 are formed integrally at their lower ends with the disk 30, and each extends therefrom inwardly, upwardly, outwardly and thence inwardly and upwardly, to provide between its ends an outwardly curved portion 34 to bear against shoulder 35 and thus resiliently hold disk 30 against seat 7. The outer ends of the stems extend outwardly and thence downwardly along the exterior side of the peripheral flange 8, to provide on each stem an end portion 37 which may be used as a hand-gripping portion. To remove the device from the bottle, the user merely compresses end portions 37 towards the opposite sides of the neck, thus springing curved portions 34 off shoulder 35.

When the device is inserted in the bottle neck, it automatically assumes and maintains its sealing position shown in the drawing, by virtue of the resiliency and formation of the stems 32.

The device may be allowed to remain in the bottle to act merely as a closure even after the cream and milk have been separated and the cream poured off, and subsequent pouring of the milk may be effected by slightly lifting disk 30 off its seat and holding the device in that position by pressing ends 37 against neck flange 8.

While in the foregoing I have described specific elements and associations of parts which I have found desirable, I wish it understood that various modifications and adaptations may be made therein within the broader scope and spirit of my invention as defined by the appended claims.

I claim:

1. In combination with a milk bottle having a neck, the upper interior portion of the neck presenting a downwardly facing annular shoulder and the lower interior portion of said neck presenting an upwardly facing annular seat, a valve for closing communication between the neck and the lower portion of the bottle including a disc engaging said seat, and a pair of resilient stems extending upwardly from diametrically opposite sides of the disc, said stems being bent outwardly between their ends whereby to bear against said shoulder and thereby resiliently hold the disc against the seat.

2. In combination with a milk bottle having a neck, the upper interior portion of the neck presenting a downwardly facing annular shoulder and the lower interior portion of said neck presenting an upwardly facing annular seat, a valve for closing communication between the neck and the lower portion of the bottle including a disc engaging said seat, and a pair of resilient stems extending upwardly from diametrically opposite sides of the disc, said stems being bent outwardly between their ends whereby to bear against said shoulder and thereby resiliently hold the disc against the seat, and having upper end portions extending outwardly and downwardly over and spaced from the exterior of the neck whereby to be compressible towards each other for disengaging the outwardly bent portions from said shoulder.

ANTHONY ARONEY.